United States Patent
Spelman

(10) Patent No.: US 7,758,906 B2
(45) Date of Patent: Jul. 20, 2010

(54) THICKENING SYSTEM FOR PRODUCTS PREPARED WITH MILK

(75) Inventor: Kieran P. Spelman, New City, NY (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1040 days.

(21) Appl. No.: 11/336,280

(22) Filed: Jan. 20, 2006

(65) Prior Publication Data

US 2007/0172568 A1 Jul. 26, 2007

(51) Int. Cl.
*A21D 10/00* (2006.01)

(52) U.S. Cl. .................. 426/555; 426/569; 426/580; 426/590

(58) Field of Classification Search ............ 426/72, 426/74, 573, 575, 577, 578, 579, 580, 531, 426/561, 590, 569, 593, 555
See application file for complete search history.

(56) References Cited

U.S. PATENT DOCUMENTS

| | | | |
|---|---|---|---|
| 3,914,456 A | | 10/1975 | Norsby et al. |
| 3,934,049 A | * | 1/1976 | Lauck .......... 426/573 |
| 4,081,567 A | | 3/1978 | Haber |
| 4,136,209 A | | 1/1979 | Fox |
| 4,219,583 A | * | 8/1980 | Igoe ........... 426/573 |
| 4,276,320 A | | 6/1981 | Moirano |
| 4,623,552 A | * | 11/1986 | Rapp .......... 426/575 |
| 4,859,484 A | | 8/1989 | Bielskis et al. |
| 4,919,958 A | | 4/1990 | Kadan et al. |
| 5,221,549 A | | 6/1993 | Leshik |
| 5,348,756 A | | 9/1994 | Lee et al. |
| 5,356,654 A | | 10/1994 | Speirs et al. |
| 5,447,732 A | | 9/1995 | Tanimoto et al. |
| 5,597,603 A | * | 1/1997 | Cha et al. ...... 426/573 |
| 6,616,955 B2 | | 9/2003 | Nunes et al. |
| 6,703,056 B2 | | 3/2004 | Mehansho et al. |
| 6,759,073 B2 | * | 7/2004 | Heisey et al. .... 426/575 |
| 2002/0122847 A1 | | 9/2002 | Nunes et al. |
| 2003/0026872 A1 | | 2/2003 | Dake et al. |
| 2004/0228954 A1 | * | 11/2004 | Tejayadi ........ 426/521 |

FOREIGN PATENT DOCUMENTS

| | | | |
|---|---|---|---|
| CH | 685 590 A5 | | 8/1995 |
| EP | 0403825 | * | 5/1990 |
| EP | 0 403 825 A2 | | 12/1990 |
| GB | 1 170 868 A | | 11/1969 |

OTHER PUBLICATIONS

V. Oopik, Effects of sodium citrate ingestion before exercise on endurance performance in well trained college runners, Jul. 15, 2005, British Journal of Sports Medicine.*
Introduction to Carrageenan, Feb. 24, 2004, http://www.cybercolloids.net/library/carrageenan/intro.php.*
Sports medicine NPL, 2003.*
archive.org NPL.*

* cited by examiner

*Primary Examiner*—Drew E Becker
*Assistant Examiner*—Preston Smith
(74) *Attorney, Agent, or Firm*—Fitch, Even, Tabin & Flannery

(57) ABSTRACT

A dry mix thickening system for preparation of a beverage product containing milk comprises a buffer, a hydrocolloid, and a chelating agent comprising tetrasodium pyrophosphate. When the dry mix thickening system is added to milk, viscosity builds within about 20 seconds to about 90 seconds to provide a thickened beverage product, without forming insoluble aggregates of the hydrocolloid. No heating is required. In addition, the only shear required to incorporate the dry mix thickening system into the milk is manual stirring.

17 Claims, No Drawings

THICKENING SYSTEM FOR PRODUCTS PREPARED WITH MILK

BACKGROUND OF INVENTION

The present invention is directed to a dry mix thickening system for beverage products prepared with milk, to beverage products, and to methods of making such beverage products. The dry mix thickening system comprises a buffer, a hydrocolloid, and a chelating agent comprising tetrasodium pyrophosphate. When combined with milk using low shear, the dry mix provides a thickened beverage product without heating and without forming insoluble aggregates.

Commercial powdered beverages prepared with milk are very thin. When hydrocolloids are added to milk without providing shear and/or heat, they bind with calcium ions in the milk and form insoluble aggregates (e.g., "fish eyes") or an insoluble layer. As a result, there is no intended thickening. This failure to thicken is especially true in sugar-free and low sugar products, which do not have sufficient granular particles to act as a spacing agent and do not disperse the hydrocolloid well. Currently, there is no way to build viscosity in milk (especially cold milk) without using shear or heat. Ready-to-drink products may use high shear to disperse and activate hydrocolloids used as thickening agents. In addition, ready-to-drink products may use pectin, which requires a heating step.

U.S. Pat. No. 5,221,549 discloses that polyphosphates such as tetrasodium polyphosphate (TSPP) and sodium acid polyphosphate are used to reduce the amount of protein aggregation which results from heat treating a ready-to-eat pudding formulation at temperatures in excess of 265° F. The system forms a complete matrix and also uses starch.

U.S. Pat. No. 6,759,073 discloses compositions, which are useful as stabilizer and thickener systems. The compositions comprise a pectin compound, an alginate compound, and a cellulose compound such as carboxymethylcellulose. Ferric pyrophosphate may be added as an enhancer material.

U.S. Pat. No. 6,703,056 discloses beverage compositions comprising (a) a first component, which is arabinogalactan, and (b) a second component comprising one or more minerals selected from the group consisting of zinc, iron, magnesium, calcium, selenium, iodine, and fluorine. Iron may be in the form of ferric pyrophosphate.

U.S. Pat. No. 6,616,955 and U.S. Patent Application Publication 2002/0122847 disclose beverage compositions comprising (a) a calcium source comprising a form selected from calcium carbonate, solubilized species thereof, and mixtures thereof; and (b) at least about 20 milligrams of a magnesium source per reference serving of the composition. The beverage may contain iron in the form of ferric pyrophosphate.

U.S. Patent Application Publication 2003/0026872 A1 discloses essentially dry compositions that are suitable for use as foods and/or beverages. Preferably, the essentially dry compositions are beverage compositions, wherein the compositions are diluted with a liquid prior to consumption. The composition may contain iron in the form of ferric pyrophosphate.

U.S. Pat. No. 5,447,732 discloses a composition containing a mineral absorption accelerator. The composition contains minerals and products of poly-γ-glutamic acid as a mineral absorption accelerator and may be used in foods in a variety of forms, including a beverage, gel, solid or powder form. The mineral may be iron in the form of ferric pyrophosphate.

U.S. Pat. No. 5,356,654 discloses alginate and/or pectate gels produced by forming an aqueous mixture of a water soluble or water dispensible alginate and/or pectate, a calcium ion sequestrant and a sparingly soluble calcium ion source at low temperature and heating the mixture to cause gelation thereof. The sequestrant is preferably sodium or potassium pyrophosphate but at least part of the sequestrant may be replaced by meat having calcium ion sequestring activity.

U.S. Pat. No. 5,348,756 discloses fruit-flavored, powdered gelatin dessert mixes formulated to obtain a relatively high pH of at least 4.15, and a relatively low gelatin load weight while still retaining a desirable sour taste.

U.S. Pat. No. 4,919,958 discloses egg-free compositions for flan-type puddings. The egg-free compositions comprise milk, sweetener, rice flour, carrageenan, tetrapotassium pyrophosphate, pectin, locust bean gum and at least one material selected from the group consisting of cheese whey protein isolate and xanthane gum. A cook step is required in preparation of the pudding.

U.S. Pat. No. 4,859,484 discloses combining a starch, hydrated with between 0.7 and 2.0 parts of water and which has been brought to the verge of gelatinization, with a hydrocolloid gum, which also may have been pre-hydrated, to form a mixture. The mixing process includes intimately mixing the hydrocolloid gum with the starch as the latter is gelatinizing; heating the uniform blend under pressure but under low enough shear to preclude starch degradation; and extruding it through a die so that it expands and creates a product with a large surface area to facilitate drying. TSPP is listed among other salts as a way to raise the pH of a starch/gum solution.

U.S. Pat. No. 4,276,320 discloses a method and composition for making a water dessert gel having a controlled melting temperature consisting of kappa carrageenan, a sodium salt of a sequestering agent, and ionizable potassium in amounts sufficient to sequester all polyvalent cations present.

U.S. Pat. No. 4,136,209 discloses a method for the production of a pectin preparation. A fruit pectin having a metal binding power of 30 to 140 g of metal salt is dissolved with a phosphate to produce a solution having a pH between 4.4 to 4.8. A soluble metal salt is added to the solution. Pectin is precipitated from the solution.

U.S. Pat. No. 4,081,567 discloses a beverage prepared by reconstituting with milk or a milk substitute a dry mix composition containing a pregelatinized starch, an edible acid and a hydrocolloid gum. The hydrocolloid gum is preferably a mixture of guar gum and xanthan gum. The use of a modified and/or pregelatinized starch permits "rapid rehydration and quick setting thus preventing coagulation and curdling of the milk proteins" by the acid. The product would be at pH of 3-5.

U.S. Pat. No. 3,934,049 discloses an improved gelling agent composition comprising in combination an alkali metal pyrophosphate, an alkaline earth metal orthophosphate, an alkali metal carbonate, and a thickening agent, the combination being useful in preparing cold set milk puddings. Preferably, the improved gelling agent combination comprises tetrasodium pyrophosphate or sodium acid pyrophosphate, monocalcium phosphate, sodium carbonate, and pregelatinized starch. The improved gelling agent is added to milk, or water containing redissolved nonfat dry milk, or redissolved casein to form a pudding.

U.S. Pat. No. 3,914,456 discloses a dry mix pudding composition comprising waxy maize corn and tapioca pregelatinized starches and alkali pyrophosphate, monocalcium phosphate and a potassium salt as setting salts. The product is beaten vigorously with a whisk for preparation.

There remains a need for dry mix composition that can be combined with milk using low shear to form a thickened beverage product, without heating and without forming insoluble aggregates.

SUMMARY OF INVENTION

The present invention is directed to a dry mix thickening system for beverage products prepared with milk. The dry mix composition comprises a buffer, a hydrocolloid, and a chelating agent comprising tetrasodium pyrophosphate. When added to milk using low shear, for example manual stirring, the dry mix composition builds viscosity to form a thickened beverage product without using heat. In addition, the resulting thickened beverage product does not contain any insoluble aggregates of the hydrocolloid. The thickened beverage does not form a gel, even upon refrigeration.

DETAILED DESCRIPTION OF INVENTION

The present invention will be described below with reference to specific dry mix thickening system formulations and to thickened beverage products and processing techniques. However, it will be clear to the experienced food scientist that the principles that enable improvements in these will apply to other products and processes as well.

A. Dry Mix Thickening System

According to the present invention, a dry mix thickening system for beverage products prepared with milk comprises a buffer, a hydrocolloid, and a chelating agent comprising tetrasodium pyrophosphate for the hydrocolloid. The dry mix thickening system is in the form of a powder.

The dry mix thickening system of the present invention comprises a hydrocolloid. In embodiments, the hydrocolloid may be a hydrocolloid gum including, but not limited to, guar gum, locust bean gum, xanthan gum, carrageenans, or combinations thereof. The hydrocolloid gum may also be a cellulose gum, for example, carboxymethyl cellulose. In preferred embodiments, the hydrocolloid comprises a carrageenan, for example, λ-carrageenan. The λ-carrageenan may also contain ι-carrageenan. An example of a carageenan which may be used in the dry mix thickening system is Lactarin™, commercially available from FMC. The dry mix thickening system may contain the hydrocolloid in an amount of about 0.2 g to about 0.6 g of hydrocolloid per about 200 mL to about 240 mL serving of a milk-containing beverage product.

The dry mix thickening system of the present invention comprises a buffer to keep the pH of the thickened beverage product in the range of about 6 to about 7.5. In embodiments, the buffer may comprise tripotassium citrate or trisodium citrate. Preferably, no acid is added to the dry mix composition. At a pH of about 6 or less, the thickened beverage product begins to have a dilute cottage cheese-like consistency. The dry mix thickening system may contain the buffer in an amount of about 0.25 g to about 1.0 g per about 200 mL to about 240 mL serving of a milk-containing beverage product.

According to the present invention, the dry mix thickening system also comprises a chelating agent comprising tetrasodium pyrophosphate. The chelating agent prevents the hydrocolloid from forming insoluble aggregates or an insoluble layer when mixed with milk. The dry mix thickening system may contain the chelating agent in an amount of about 0.15 g to about 0.2 g per about 200 mL to about 240 mL serving of a milk-containing beverage.

The dry mix thickening system may optionally contain one or more additives. The one or more additives may include, but are not limited to, cereal, such as wheat or oat flour; cocoa; coffee, for example, soluble coffee; flavorants; a flow agent to reduce moisture, such as magnesium oxide; a spacing agent, such as silica; colorants; starch; maltodextrin, rice fines; rice crisp particulates; synthetic sweeteners, such as aspartame or acesulphame K; natural sweeteners such as sugars; vitamins, for example, vitamins B2, B3, B6, C, A, or E; minerals, such as iron or magnesium; enzymes; prebiotics; fiber; probiotics; pharmaceuticals, or any combination thereof.

B. Beverage Product Preparation

When the dry mix thickening system is added to milk, for example milk at room temperature or below, the hydrocolloid builds viscosity to provide a thickened beverage product. In embodiments, the viscosity increases to about 50 cP to about 70 cP (as measured at room temperature) within about 20 seconds to about 90 seconds. There may be an additional viscosity build due to the milk protein-TSPP interactions such that the viscosity of the thickened beverage product increases to about 100 cP to about 300 cP (as measured at room temperature) within about 30 minutes. A starch is not required to build viscosity. Thus, in embodiments, the dry mix composition may not contain a starch. In embodiments, the dry mix composition may not contain pectin.

The only shear required to form the thickened beverage product is manual stirring, such as spoon stirring, sufficient to incorporate the dry mix composition into the milk. The use of a whisk or mixer is not required. Due to the presence of the chelating agent, no insoluble aggregates or insoluble layers of the hydrocolloid are formed. In addition, no heating is required. The thickened beverage product will not form a complete gel, but remains a beverage even upon refrigeration, for example, after about 48 hours.

In embodiments, the dry mix thickening system may be added to milk at high levels, for example, about 3.0 g/L to about 6.0 g/L, for example, about 4.5 g/L. In embodiments, the dry mix thickening system may be added to milk powder, which can then be added to water to make a thickened beverage product.

Depending on the amount of hydrocolloid and chelating agent used in the dry mix composition, the texture and viscosity of the thickened beverage product can be controlled to produce different types of dairy products, such as drinkable type yogurt and milkshakes.

The present invention is further illustrated by the following examples wherein all parts, percentages and ratios are by weight, all pressures are atmospheric, and all temperatures are in ° F. unless indicated to the contrary:

EXAMPLES

EXAMPLE 1

Cereal Type Beverage

|  | Gram/serving | Percent |
| --- | --- | --- |
| Sugar | 8 | 53.79 |
| Whole Grain Oat flour | 2.0000 | 13.45 |
| Strawberry flavor | 0.055 | 0.37 |
| Magnesium Oxide | 0.05 | 0.34 |
| Flo-Gard ® Silica | 0.08 | 0.54 |
| Color - red 40 | 0.0009 | 0.01 |
| Inulin | 3.1 | 20.84 |
| Vitamin premix | 0.081 | 0.54 |
| TetraSodium PyroPhosphate (TSPP) | 0.2 | 1.34 |

EXAMPLE 1-continued

Cereal Type Beverage

|  | Gram/serving | Percent |
| --- | --- | --- |
| Potassium Citrate | 0.35 | 2.35 |
| Carrageenan Gum Lactarin ™ DX 2017 | 0.5 | 3.36 |
| Rice fines | 0.4 | 2.69 |
| Artificial Sweetener Blend | 0.056 | 0.38 |
|  | 14.873 | 100.00 |

The above dry ingredients were combined to form a dry mix. The dry mix was added separately to 200 mL of milk and to 240 mL of milk and stirred with a spoon. The initial viscosity from the gum increased in about 20 to 90 seconds. There was some additional viscosity increase after 5 minutes from the milk protein-TSPP interactions, but the product remained a liquid, even after 48 hours in a refrigerator. The beverage product had the consistency of a drinkable yogurt product.

EXAMPLE 2

Cereal Type Beverage With Dry Milk

|  | Gram/serving | Percent |
| --- | --- | --- |
| Sugar | 8 | 23.21 |
| Whole Grain Oat flour | 2.00 | 5.80 |
| Strawberry flavor | 0.055 | 0.16 |
| Magnesium Oxide | 0.5 | 0.15 |
| Flogard ® | 0.08 | 0.23 |
| Color - red 40 | 0.0009 | 0.00 |
| Inulin | 3.1 | 8.99 |
| Vitamin premix | 0.081 | 0.23 |
| TetraSodium PyroPhosphate | 0.2 | 0.58 |
| Potassium Citrate | 0.35 | 1.02 |
| Carrageenan Gum | 0.5 | 1.45 |
| Rice fines | 0.4 | 1.16 |
| Artificial Sweetener Blend | 0.056 | 0.16 |
| Agglomerated Non Fat Dry Milk | 19.6 | 56.86 |
|  | 34.473 | 100.00 |

The above dry ingredients were combined to form a dry mix. The dry mix was added separately to 200 mL of water and to 240 mL of water and stirred with a spoon until fully dissolved.

EXAMPLE 3

Chocolate Milkshake Type Beverage

|  | Gram/serving | Percent |
| --- | --- | --- |
| Sugar | 9 | 72.37 |
| Cocoa Powder-lecithinated | 2.00 | 16.08 |
| Vanilla flavor | 0.2 | 1.61 |
| Magnesium Oxide | 0.05 | 0.40 |
| Flogard ® | 0.08 | 0.64 |
| TetraSodium PyroPhosphate | 0.2 | 1.61 |
| Potassium Citrate | 0.35 | 2.81 |
| Carrageenan Gum | 0.5 | 4.02 |
| Artificial Sweetener Blend | 0.056 | 0.45 |
|  | 12.436 | 100.00 |

The above dry ingredients were combined to form a dry mix. The dry mix was added separately to 200 mL of milk and to 240 mL of milk and stirred with a spoon until fully dissolved.

EXAMPLE 4

Coffee Type Beverage

|  | Gram/serving | Percent |
| --- | --- | --- |
| Sugar | 9 | 76.95 |
| Spray dried Soluble Coffee powder | 1.51 | 12.91 |
| Flogard ® | 0.08 | 0.68 |
| TetraSodium PyroPhosphate | 0.2 | 1.71 |
| Potassium Citrate | 0.35 | 2.99 |
| Carrageenan Gum | 0.5 | 4.27 |
| Artificial Sweetener Blend | 0.056 | 0.48 |
|  | 11.696 | 100.00 |

The above dry ingredients were combined to form a dry mix. The dry mix was added separately to 200 mL of milk and to 240 mL of milk and stirred with a spoon until fully dissolved.

Example 5

The same preparation was followed as in Example 1, but citric acid was added to the dry ingredients. When milk was added to the dry mix, the pH was below 6, thereby resulting in a dilute cottage cheese-like consistency.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A dry mix for preparation of a thickened beverage product containing milk, comprising a buffer, a hydrocolloid, a chelating agent comprising tetrasodium pyrophosphate, and substantially no starch to build viscosity, the hydrocolloid present in an amount of about 0.2 g to about 0.6 g per about 200 mL to about 240 mL of the thickened beverage product, the chelating agent present in an amount of about 0.15 g to about 0.2 g per about 200 mL to about 240 mL of the thickened beverage product, and the thickened beverage having a viscosity of about 50 cP to about 90 cP.

2. The dry mix according to claim 1, wherein an amount of the buffer maintains the pH of the thickened beverage product between about 6 and about 7.5.

3. The dry mix according to claim 1, wherein the buffer is selected from the group consisting of tripotassium citrate and trisodium citrate.

4. The dry mix according to claim 1, wherein the buffer is present in an amount of about 0.25 g to about 1.0 g per about 200 mL to 240 mL of the thickened beverage product.

5. The dry mix according to claim 1, wherein the hydrocolloid comprises a hydrocolloid gum or a cellulose gum.

6. The dry mix according to claim 5, wherein the hydrocolloid gum is selected from the group consisting of guar gum, locust bean gum, xanthan gum, and carrageenan.

7. The dry mix according to claim 1, wherein the hydrocolloid comprises a carrageenan.

8. The dry mix according to claim 7, wherein the carrageenan comprises λ-carrageenan.

9. The dry mix according to claim 1, further comprising cereal.

10. The dry mix according to claim 1, further comprising cocoa or soluble coffee.

11. The dry mix according to claim 1, further comprising one or more additives selected from the group consisting of a sweetener, a vitamin, a mineral, enzymes, prebiotics, fiber, probiotics, and pharmaceuticals.

12. The dry mix according to claim 1, wherein the dry mix contains no starch.

13. A method for preparing a thickened beverage product, comprising mixing the dry mix of claim 1 with milk to form a thickened beverage product.

14. A method according to claim 13, wherein the thickened beverage composition has an amount of the buffer to maintain a pH of about 6 to about 7.5.

15. A method according to claim 13, wherein the mixing is without heating and the milk is at room temperature or below.

16. A method according to claim 13, wherein the mixing is by manual stirring.

17. A method according to claim 13, wherein the thickened beverage comprises a milkshake or a drinkable yogurt.

* * * * *